Nov. 26, 1929.  M. C. LASKY  1,737,164
DENTAL BRIDGE
Filed May 26, 1926
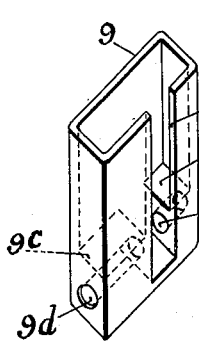
Fig. 3
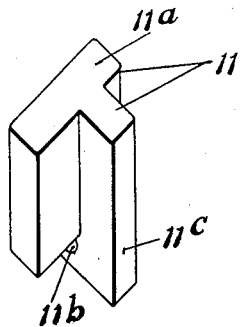
Fig. 4
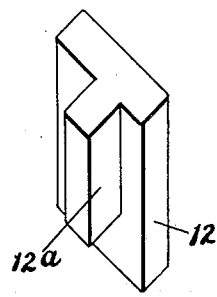
Fig. 5
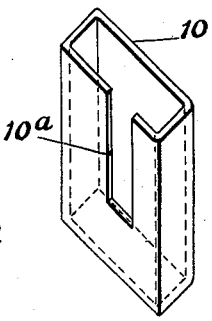
Fig. 6
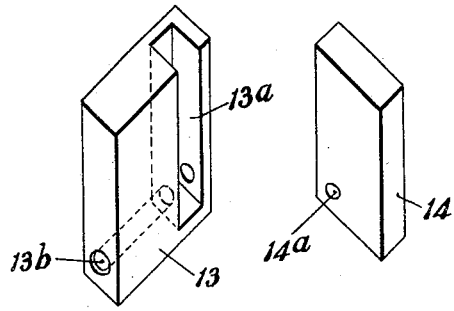
Fig. 8  Fig. 9  Fig. 10  Fig. 11
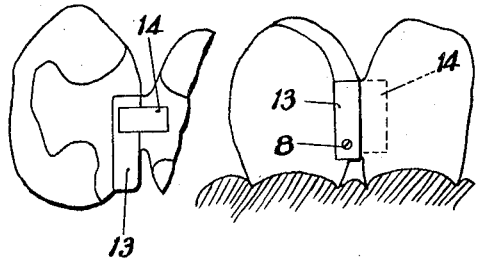
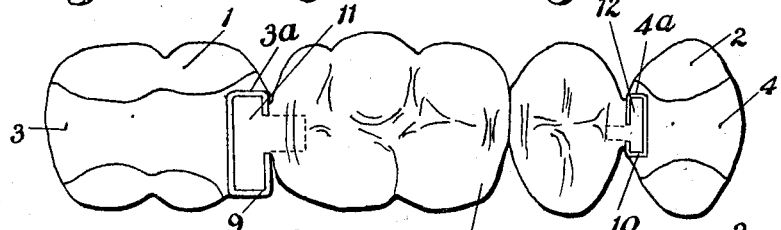
Fig. 1
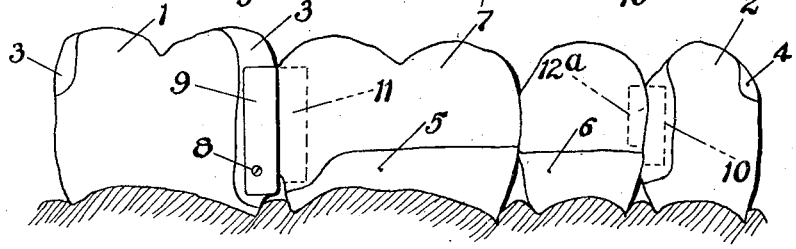
Fig. 2
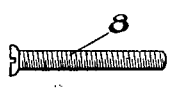
Fig. 7
INVENTOR.
Mervyn C. Lasky
BY A. B. Bowman
ATTORNEY Patented Nov. 26, 1929

1,737,164

UNITED STATES PATENT OFFICE

MERVYN C. LASKY, OF HOLLYWOOD, CALIFORNIA

DENTAL BRIDGE

Application filed May 26, 1926. Serial No. 111,726.

My invention relates to dental bridges, more particularly to that class of dental bridges known as fixed bridges, but one in which the artificial teeth may be removed for cleaning and for cleaning between the bridge supported tooth, or teeth, and the gum without removing the restorations in the natural teeth, and the objects of my invention are: First, to provide a dental bridge of this class which is substantially fixed but which may be removed by a dentist for cleaning purposes; second, to provide a bridge of this class in which the bridge is fixed between adjacent stationary teeth but so supported that it will permit slight lateral movement of the bridge relatively to the teeth and of one stationary tooth relative to the other, to permit the natural movement of the teeth in action; third, to provide a bridge of this class which is substantially fixed except when it is desired to remove the same; fourth, to provide a bridge structure of this class in which the securing screw is down off of the biting surface and fits in from the tongue side; fifth, to provide a bridge of this class in which only one side needs to be secured against the upward and downward movement; sixth, to provide a novelly constructed dental bridge of this class, and, seventh, to provide a bridge of this class which is very simple and economical of construction, durable, easy to install and with the proper tools, easy to remove and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a top or plan view on an enlarged scale showing my dental bridge in its preferred form shown mounted on two stationary teeth at its opposite ends; Fig. 2 is a rear elevational view thereof; Fig. 3 is a detail perspective view of the main bridge support receiving member; Fig. 4 is a perspective view of the main bridge supporting member in the preferred form; Fig. 5 is a perspective view of the secondary bridge supporting member in the preferred form; Fig. 6 is a perspective view of the secondary bridge support receiving member in the preferred form; Fig. 7 is the screw for securing one of the bridge receiving and supporting members together; Fig. 8 is a bridge support receiving member in a slightly modified form from that of Fig. 3; Fig. 9 is a perspective view of a bridge supporting member in a slightly modified form from that of Figs. 4 and 5 of the drawings; Fig. 10 is a fragmentary top or plan view showing the connection between the bridge and stationary tooth showing the modified form of application shown in Figs. 8 and 9, and Fig. 11 is a side elevational view thereof.

Similar characters of reference refer to similar parts and portions throughout the several views of the drawings.

The stationary tooth 1, stationary tooth 2, restoration 3, restoration 4, bridge supported teeth 5 and 6, bridge member 7 and screw 8 constitute the principal parts and portions of my dental bridge in its preferred form.

The stationary teeth 1 and 2 are the regular teeth of the mouth wherever positioned and the bridge is used to fill a space where one or more teeth have been removed between the stationary teeth 1 and 2. The tooth 1 is provided with a restoration 3 in its upper portion and extending down along the side adjacent the bridge. The stationary tooth 2 is also provided with a restoration 4 in similar form. In the inner and upper sides of the restorations 3 and 4 are cut recesses $3^a$ and $4^a$ which conform to and are adapted to receive the bridge supporting receiving members 9 and 10. The bridge receiving member 9 is a rectangularly shaped hollow member open at its upper side and provided with a slot $9^a$ extending vertically in one side to near the bottom side of said member. It is provided on each side of the slot $9^a$ in the bottom side with filler portions $9^b$ and $9^c$ which are provided with holes $9^d$ and $9^e$ which are adapted to receive the threaded screw 8 which fits into said holes $9^d$ and $9^e$. The receiving member 10 is a member similar to member 9 except that it is not provided with the filler members at the bottom side and therefore the hole for the screw 8 is omitted. Secured to the bridge member 7 intermediate its sides is a bridge supporting member 11 which consists of a rectangularly shaped portion $11^a$ which is adapted to fit into the hollow portion of the member 9 and its lower edge rests on the filler portions $9^b$ and $9^c$ and provided with an extended lug portion $11^c$ which is secured into the bridge member 7 and adapted to fit in the slot $9^a$ in the receiving member 9. It is also provided with a hole $11^b$ which is adapted to receive the screw 8, it being noted that this hole $11^b$ may be slightly larger than the screw to permit slight movement of the member 11 in the member 9 to take care of lateral movement of the teeth and bridge, or the member 11 may fit tightly in this receiving member 9. Secured in the other end of the bridge member 7 is the bridge supporting member 12 which also consists of a rectangularly shaped portion which fits into the hollow portion of the member 10 and is provided with an extended lug portion $12^a$ which is adapted to fit in the groove $10^a$ in the receiving member 10. This lug portion 12 is rigidly secured in the bridge 7 by soldering or otherwise, it being noted that there is no screw required in the one end because the movement must be vertical or perpendicular and the one screw 8 in the one end is sufficient to hold the bridge in position.

In the modified form of construction shown in Figs. 8 to 11 inclusive, members 13 and 14 are substituted for the members 10 and 12, the member 13 in this case consisting of a rectangularly shaped member provided with a slot $13^a$ in one side thereof and extending to near the bottom side and provided with a hole $13^b$ adapted for the screw 8 to fit therein, and the bridge supporting member 14, which is substituted for the member 11, is a rectangularly shaped piece adapted to fit in the slot $13^a$ and provided with a hole $14^a$ adapted to receive the screw 8. The member 13 is embedded in the restoration 4, and the member 14 is secured intermediate the sides of the bridge 7, the other end of the bridge being supported by the members 9 and 11 as in the preferred form. In Figs. 10 and 11 is shown the application of the members 13 and 14 in a stationary and bridge portion.

It will be noted that the hollow portions in either the member 9 or 10, should be slightly larger than the supporting member 11 or 12 which fits therein so that there may be slight movement providing slight lateral movement of the bridge relatively to the stationary teeth and in which case there should be slight clearance between the outer surface of the screw and the hole in the support 11. It will also be noted that these members fit into each other and extend down along the side of the teeth providing positive supporting means for the bridge relatively to the stationary teeth.

Though I have shown and described a particular construction, combination and arrangement of parts and portions and certain modifications thereof, I do not wish to be limited to this particular construction, combination and arrangement, nor to the modifications, but desire to include in the scope of my invention the construction, combination and arrangement substantially as set forth in the appended claims.

Having thus described my invention, what I claim as new and desire to secure by Letters Patent is:

1. In a dental bridge, the combination with two spaced apart stationary teeth, of restorations in the upper and side portions of said stationary teeth, a pair of separate recess members rigidly secured in said restorations in the sides of said stationary teeth and forming portions of the lateral outer sides of said restorations, a bridge member provided with laterally extended portions adapted to fit into said recess members and to move upwardly and downwardly therein, artificial teeth supported by said bridge member, said bridge member substantially abutting the outer sides of said recess members and screw means for securing one end of said bridge member in one of said recess members near the lower side thereof.

2. In a fixed dental bridge, the combination with two spaced apart stationary natural teeth, of inlays positioned in the adjacent side portions of said stationary teeth, said inlays being provided with recess portions having vertical slots at the adjacent sides of the recess portions, a bridge member provided with extended lugs at its opposite ends adapted to extend into said slots for supporting said bridge member, said lugs being adapted to be easily removed therefrom, and a screw securing one of said lugs in one of said slots, said screw extending through the side of the recess portion and being flush with the exterior surface of the recess portion of the inlays of said teeth.

3. In a fixed dental bridge, the combination with two spaced apart stationary natural teeth, of inlays in the adjacent side portions of said stationary teeth, vertically slotted member secured in said inlays at the adjacent sides thereof, a bridge member provided with extended lugs at its opposite ends, said lugs being positioned in the slots of said slotted members and adapted to be easily removed therefrom, and screw means securing said lugs in said slots, said screw means extending through the side of one of the slotted members and being flush with the exterior surface of said slotted member.

In testimony whereof, I have hereunto set my hand at Los Angeles, California, this 20th day of May, 1926.

MERVYN C. LASKY.